Sept. 10, 1968  R. R. GIDNER  3,401,091
WATER STILL
Filed April 19, 1966  2 Sheets-Sheet 1

INVENTOR
Robert R. Gidner
BY
Charles L. Lovercheck
atty

Sept. 10, 1968    R. R. GIDNER    3,401,091
WATER STILL
Filed April 19, 1966    2 Sheets-Sheet 2

INVENTOR
Robert R Gidner
BY
Charles L Lunchah
atty

United States Patent Office 3,401,091
Patented Sept. 10, 1968

3,401,091
WATER STILL
Robert R. Gidner, Fairview, Pa., assignor to American Sterilizer Company, Erie, Pa., a corporation of Pennsylvania
Filed Apr. 19, 1966, Ser. No. 543,741
4 Claims. (Cl. 202—176)

ABSTRACT OF THE DISCLOSURE

The invention relates to a still wherein the evaporator and condenser are contained in a pressure vessel which includes means for boiling the distillate in the vessel after it is collected to purge the same of undesirable gases.

---

This invention relates to distillation stills and, more particularly, to stills for distilling liquids.

The present invention incorporates a condenser and an evaporator inside a pressure vessel. The distillation is accomplished inside the pressure vessel whereby the undesirable gases are purged from the distillate and the pressure inside the vessel discharges distillate without the aid of pumps. The distillate is collected by an internal condenser which heats and boils the distillate before discharging it at a uniform rate. This accomplishes an efficiency not possible with previous stills.

The distilling device disclosed herein is built into one closed container that may be operated either with or without internal pressure. Within the bottom portion of the container is a device to regulate the feed water level. This water is boiled by means of either a steam-to-water heat exchanger that is partially or completely submerged below the controlled feed water level, or by other types of heat such as electric Calrod heaters. The impurities are prevented from concentrating in the water in the bottom portion of the still by a bleed to drain through a fixed orifice. The orifice is prevented from plugging by a device that is actuated by the motion of the float that controls the water level. This still can also be operated non-pressurized with a fixed amount of water fed to the bottom section and a relatively large overflow at a predetermined height to maintain water level.

The top of the distilling device contains another steam-to-water heat exchanger. In this case, cooling water flows through the inside of the heat exchanger, and the steam generated by boiling the water in the bottom condenses on the outer surfaces. The steam that condenses on the outer surfaces drips into a collector pan immediately below this heat exchanger. The distillate collected in this pan is heated by pressurized steam contained in a false bottom, and the collected water is caused to boil to remove absorbed gases. The distillate level is controlled in the collector pan by a float device. Distillate is discharged below the water level to prevent the escape of gases along with the distillate.

To further facilitate the removal of gases, the cooling water passing through the condenser is further utilized by passing it through an ejector nozzle. The ejector is connected to pull the gases from the inside of the still from the condenser area.

The closed container constituting the still body is connected to atmosphere with a relief valve and a vacuum breaker to limit pressure extremes within the still body.

It is, accordingly, an object of the present invention to provide an improved distilling device.

Another object of the invention is to provide a distilling device wherein a condenser and evaporator are contained within a pressure vessel.

Still another object of the invention is to provide a distilling device wherein the condenser and evaporator are container inside a pressure vessel and means is provided to boil the distillate after it has been condensed to purge undesirable gases therefrom.

A further object of the invention is to provide an improved still.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 3:
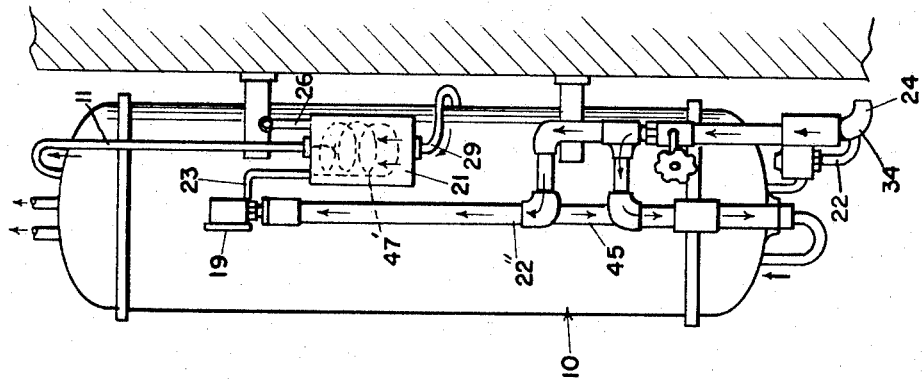
FIG. 3 is another side view of the still.
Figure 2:
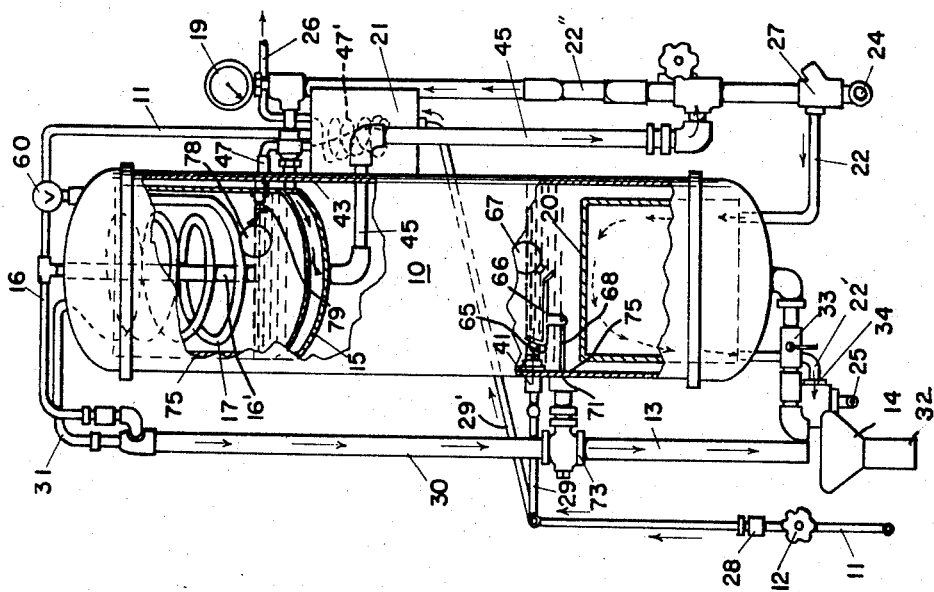
FIG. 2 is a front view of the still.
Figure 1:
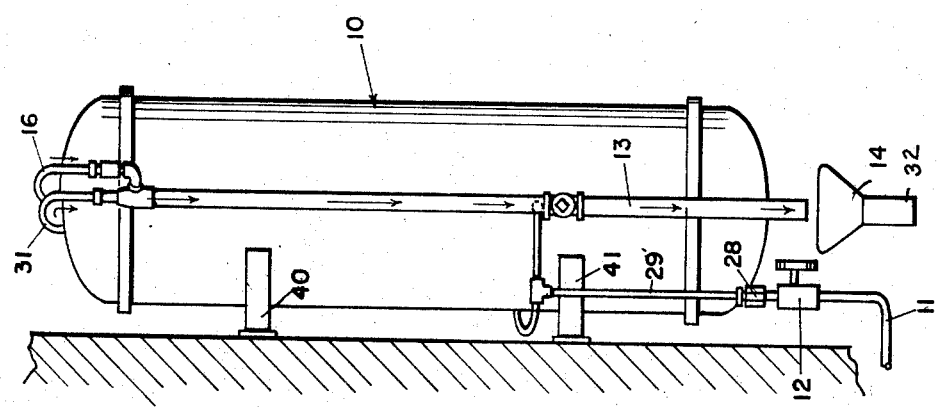
FIG. 1 is a side view of a still according to the invention.

Now with more particular reference to the drawings, the still shown is made up of a pressure vessel 10 which may be in the form of a tank closed at the bottom and top as shown. It may be supported on a wall by means of brackets indicated at 40 and 41 in the usual manner.

In the example shown, the liquid to be distilled which may be cold water may be supplied through a pipe 11 which could be an ordinary water pipe or the like. The liquid passes through the shut off valve 12 and flow control 28 to the pipe 29 and pipe 29'. From the pipe 29, the liquid flows to the inside of the pressure vessel by way of float valve 42 and collects in the bottom of tank 10 around evaporator 20. By way of branch pipe 29', water flows up around the coolant coil 47' in the distillate cooler 21, then from cooler 21 through pipe 11 and valve 60 into coil 17 in the interior of the pressure vessel heated by heater 15 from which it is discharged through the pipe 31 and drain pipe 30 to the drain line 13 into the drain 32.

Figure 4:
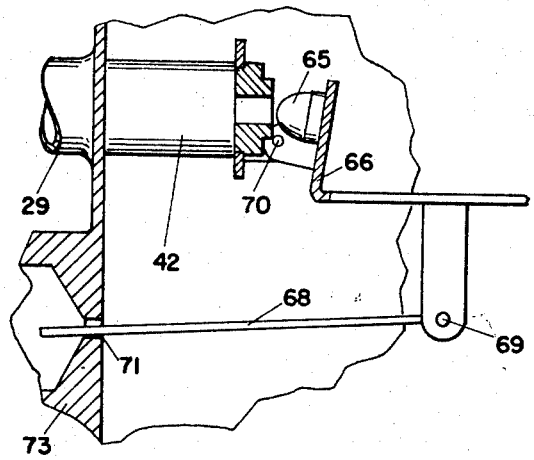
FIGS. 4 and 5 are enlarged partial views of the still.
Figure 5:
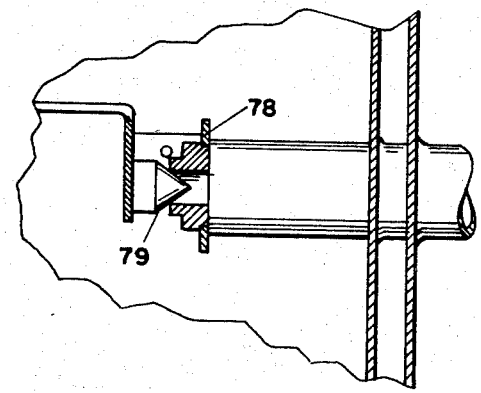

Pipe 29 is connected inside the tank 10 as illustrated in FIG. 4 to valve 42 which has a valve member 65 connected to actuating arm 66. A float 67 is attached to actuating arm 66. Likewise, rod 68 is attached to arm 66 at 69. Arm 66 is pivoted to valve 42 at 70. Rod 68 extends through orifice 71 and slides loosely therein so that the rod 68 moving back and forth with arm 66 actuated by float 67 keeps boiler scale from obstructing orifice 71.

The inside of tank 10 is connected to pipe 73 by orifice 71. Pipe 73 is connected to pipe 13.

The level of water inside the pressure vessel 10 is controlled by means of a float valve 42.

An evaporator indicated at 20 is provided in the bottom of the pressure vessel. This evaporator 20 may be any kind of the well known heat exchangers and is supplied steam from the supply line 24 through line 22 into evaporator 20, and thence to the steam discharge line 22', and thence to the trap 34 from which it will flow to a suitable drain.

Steam is also directed through line 22" and to the heater 15 at the bottom of the condenser tank 75 to reboil the condensate. From the heater 15 steam that may be condensed therein flows through the line 45 and line 22 to evaporator 20 and from evaporator 20 to the drain line 22' and drain 25.

The condenser tank 75 is an open topped vessel. At the bottom the tank 75 receives condensate from the steam that is collected on the coil 17. This condensate is re-boiled by the heat of steam heating tank 15 and objectionable gases are discharged through pipe 16' to pipe 16 to pipe 30. The pressure of steam in line 22" is measured by gauge 19. The tank 10 may be drained by opening valve 33 which will discharge into waste funnel 14.

The level of condensate in the tank 75 is maintained by float valve 78. Float valve 78 has a float 79 which is raised and lowered by the level of condensate in tank 75. The float actuates valve member 79.

The distillate in the condenser 44 is urged outward by the pressure on top of it inside the pressure vessel 10 and it is discharged through pipe 47 into the cooler 21 through coil 47'. From thence it may be drawn off after it flows through coil 47' through the distillate outlet 26.

The foregoing specification set forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A pressure still comprising
   a generally cylindrical vertically disposed pressure vessel,
   a condenser tank having a generally cylindrical tank in said pressure vessel in the upper part thereof,
   an evaporator in the bottom section of said pressure vessel below said condenser,
   means to supply a liquid to be distilled into the evaporator,
   movable valve means to maintain the liquid in said evaporator at a predetermined quantity,
   drain means connected to said evaporator for discharging liquid being distilled,
   pipe means including an orifice connecting the liquid in said evaporator to said drain means,
   means to circulate a cold liquid into said pressure vessel and through said condenser,
   means to heat said evaporator to evaporate said liquid in said evaporator,
   said condenser comprising an open topped cup-shaped container means to collect condensed vapor evaporated by said evaporator, said open topped container being spaced from the side walls of the pressure vessel and disposed within the vessel, the bottom of said vessel being provided with a steam jacket,
   and orifice means in the side wall of said container to conduct distillate from said condenser to an outlet, a cooling coil connected to the outlet in heat exchange with cold liquid to provide a distillate cooler,
   and means comprising a reciprocable rod which extends through said pipe orifice and actuated by said valve means for keeping said pipe orifice means from stopping up.

2. The still recited in claim 1 wherein
   said distillate cooler is attached to the outside of said pressure vessel and the inside of said container is connected to said cooling coil whereby distillate from said container flows therethrough to said outlet.

3. The still recited in claim 1 wherein
   said cold liquid is connected in series with said liquid cooler and said condenser.

4. The still recited in claim 1 wherein
   means comprising a pipe having one open end disposed in said open topped container is connected to said condenser and to an outlet to conduct undesirable gases from said condenser.

References Cited

UNITED STATES PATENTS

| | | | |
|---|---|---|---|
| 845,285 | 2/1907 | Wittemann | 202—187 X |
| 1,544,348 | 6/1925 | Rorke | 203—10 X |
| 1,827,846 | 10/1931 | Holmquist | 202—177 |
| 1,902,538 | 3/1933 | Brace et al. | 202—177 |
| 1,990,831 | 2/1935 | Lea | 202—177 X |
| 2,226,828 | 12/1940 | Moran | 202—177 |
| 2,301,835 | 11/1942 | White et al. | 202—187 X |
| 2,392,893 | 1/1946 | Williamson | 202—187 |
| 3,326,778 | 6/1967 | Mock | 203—100 X |
| 2,625,506 | 1/1953 | Baer | 202—196 |

FOREIGN PATENTS 839,116  7/1949  Germany.

NORMAN YUDKOFF, *Primary Examiner.*

FOLSOM E. DRUMMOND, *Assistant Examiner.*